(12) United States Patent
Conraux

(10) Patent No.: US 7,439,800 B2
(45) Date of Patent: Oct. 21, 2008

(54) AMPLITUDE DEMODULATOR FOR AN ELECTROMAGNETIC TRANSPONDER

(75) Inventor: Jérôme Conraux, Trets (FR)

(73) Assignee: STMicroelectronics SA, Montrouge (FR)

( * ) Notice: Subject to any disclaimer, the term of this patent is extended or adjusted under 35 U.S.C. 154(b) by 169 days.

(21) Appl. No.: 11/313,246

(22) Filed: Dec. 20, 2005

(65) Prior Publication Data

US 2006/0158243 A1 Jul. 20, 2006

(30) Foreign Application Priority Data

Dec. 20, 2004 (FR) .................................. 04 53073

(51) Int. Cl.
*H03D 1/10* (2006.01)
(52) U.S. Cl. .................... 329/347; 340/10.1; 340/572.5
(58) Field of Classification Search ................ 340/10.1, 340/572.5; 329/347
See application file for complete search history.

(56) References Cited

U.S. PATENT DOCUMENTS

| 4,494,241 A | 1/1985 | Mayoux ....................... 375/76 |
| 4,754,477 A | 6/1988 | Tanaka et al. ................ 379/165 |
| 6,031,419 A | 2/2000 | Roberts et al. ............... 329/349 |
| 6,639,459 B1 * | 10/2003 | Devilbiss ..................... 329/341 |

* cited by examiner

*Primary Examiner*—Robert J. Pascal
*Assistant Examiner*—James E Goodley
(74) *Attorney, Agent, or Firm*—Lisa K. Jorgenson; Dennis M. de Guzman; Seed IP Law Group PLLC

(57) ABSTRACT

An amplitude demodulator comprising a capacitive element for filtering a first D.C. component of a received signal, an element for detecting edges in the signal provided by the capacitive element, and at least one switching element for forcing, at least after detection of an edge, the returning of the signal provided by the capacitive element to a second D.C. component.

20 Claims, 2 Drawing Sheets

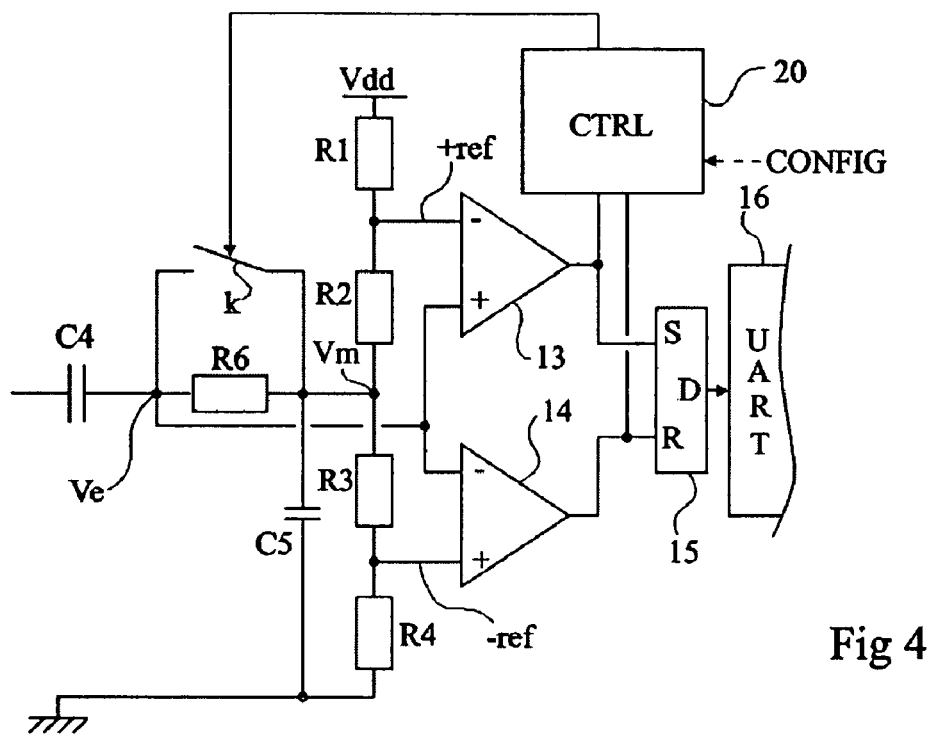
Fig 4
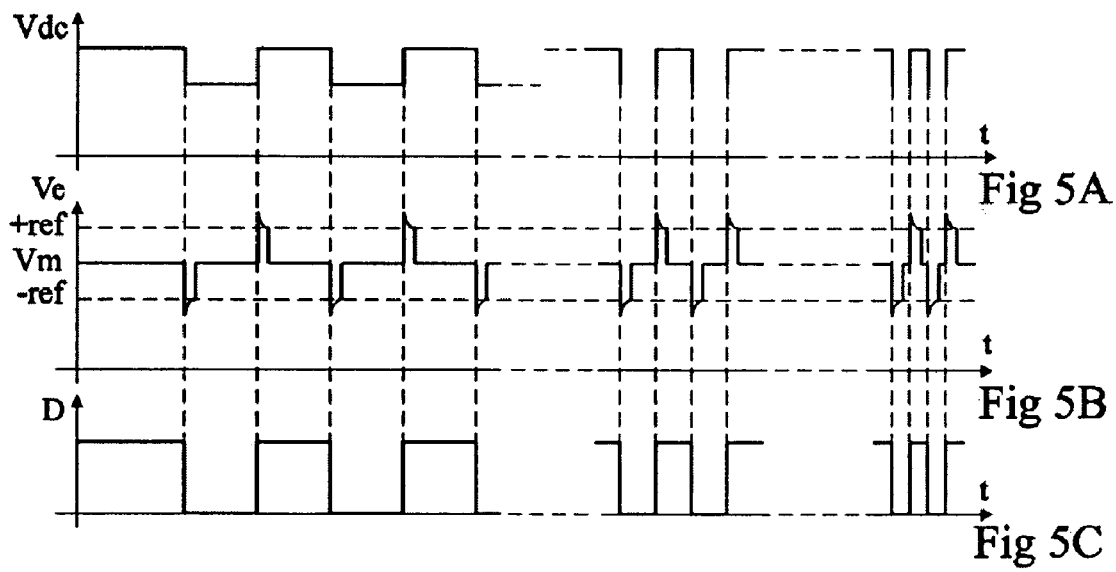
Fig 5A
Fig 5B
Fig 5C
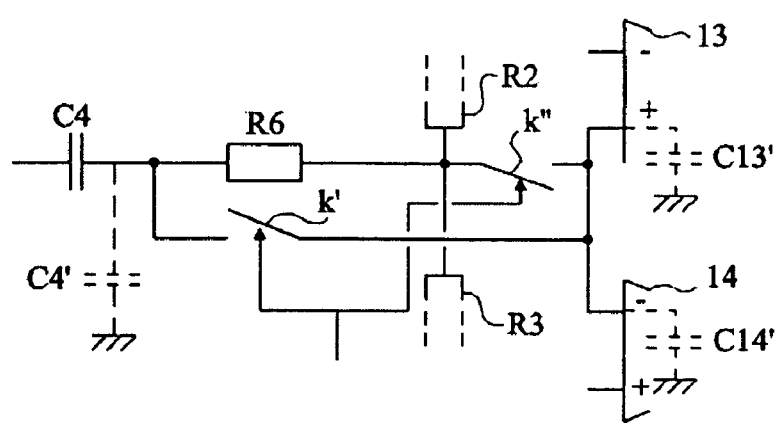
Fig 6

AMPLITUDE DEMODULATOR FOR AN ELECTROMAGNETIC TRANSPONDER

BACKGROUND OF THE INVENTION

1. Field of the Invention

The present invention generally relates to amplitude-modulation radio-frequency transmissions and, more specifically but not exclusively, to transmissions performed with a modulation index smaller than one.

The present invention applies for example to electromagnetic transponder systems in which a high-frequency carrier is amplitude-modulated by a terminal for transmission to an electromagnetic transponder, for example, carried by an electronic tag or a smart card, in the field of the terminal. The present invention applies, as one possible example, to electromagnetic transponders in an electronic passport application.

2. Discussion of the Related Art

Systems for electromagnetic transponders are based on the cooperation between an oscillating circuit on the read/write terminal side and a resonant circuit on the electromagnetic transponder side (generally, a portable element), to exchange information by using a high-frequency field radiated by the oscillating circuit of the terminal. Often, the high-frequency carrier is also used as a remote-supply carrier providing the transponder supply power.

An example of application of the present invention relates to transponder systems based on standards ISO 14443 and 15693 according to which the remote-supply carrier radiated by the terminal is 13.56 MHz, while a back-modulation sub-carrier may be used by the transponders to transmit information to the terminal with an 847.5-kHz frequency. In the terminal-to-transponder direction, the carrier is modulated in amplitude with a modulation index generally on the order of 10% with a flow rate on the order of 106 kilobits per second. The modulation index defines as being the amplitude difference between the transmission of a state 1 and the transmission of a state 0, divided by the sum of these amplitudes.

FIG. 1 very schematically shows in the form of blocks an example of an electromagnetic transponder system to which the present invention applies. A transponder 1 (TR) is intended to be placed in the electromagnetic field of a terminal 2 (TERM) having an inductive element L2 of an oscillating circuit emitting a high-frequency radiation detected by an antenna L1 of transponder 1.

FIG. 2 very schematically shows, partly in the form of blocks, an example of a conventional architecture of an electromagnetic transponder 1, intended to communicate with a read/write terminal (not shown in FIG. 2). The transponder comprises an oscillating circuit 10, formed of an inductive element L1 forming an antenna, in parallel with a capacitor C1 at the A.C. input terminals of a rectifying bridge 11. The rectified output terminals of bridge 11 are connected by a storage capacitor Cs. As an alternative (not shown), capacitor Cs is replaced with a bias source (for example, a current source or a resistor, or even directly the remotely supplied load).

The signal detected when transponder 1 is in the field of a terminal is used, among others, for extracting a supply voltage Vdd from the transponder circuits, by means of a regulator 12 (REG) and to decode the possible information transmitted by the terminal.

For this purpose, the transponder comprises an amplitude-demodulation circuit comprising, for example, a low-pass filter schematically formed of a resistor R5 and of a capacitor C3, a terminal of resistor R5 being connected to the common node of capacitor Cs and of one of the output terminals of bridge 11 (and thus receives the rectified and filtered voltage Vdc), while its other terminal is connected to the common node between capacitor C3, having its other electrode connected to ground, and a capacitor C4 filtering the D.C. component to provide on its other electrode a signal Ve only containing the edges of voltage Vdc. The cut-off frequency of the high-pass filter (capacitor C4) is selected to let through with no significant dimming the binary data amplitude-modulated on the carrier. Further, capacitor Cs takes part in a low-pass filtering such that rectified and filtered Vdc carries the envelope of the amplitude-modulated signal.

Signal Ve is applied on a first terminal of a resistive element R6, having its other terminal connected to ground by a capacitor C5. Signal Ve is further applied to first respective inputs (for example, non-inverting and inverting) of two comparators 13 and 14 with two thresholds +ref and −ref. Thresholds +ref and −ref are obtained by a dividing bridge formed, for example, of four resistive elements R1, R2, R3, and R4 in series between two terminals of application of voltage Vdd, the junction point of resistors R1 and R2 providing voltage +ref, the junction point of resistors R2 and R3 providing an average value Vm to the second terminal of resistor R6, and the junction point of resistors R3 and R4 providing level −ref. Average voltage Vm depends on the operating ranges of comparators 13 and 14 and/or on the downstream circuits. In the example, the average voltage corresponds to half Vdd/2 of the supply voltage.

The dividing bridge and resistor R6 enable setting a D.C. component to value Vm for signal Ve carrying the modulation edges only.

The outputs of comparators 13 and 14 are connected to the respective S input for setting to 1 and reset input R of an RS-type flip-flop 15 having its output D providing the detected (demodulated) state to a digital interpretation circuit 16 (for example, an arithmetical and logic unit UART).

A demodulator such as shown in FIG. 2 is described, for example, in U.S. Pat. No. 6,031,419.

To simplify the representation of FIG. 2, account has only been taken of the receive portion of the transponder. In particular, the back-modulation elements of the load formed by the transponder in the electromagnetic field of a terminal for a transmission in the terminal-to-transponder direction have not been shown. Further, a signal (not shown) is directly sampled from oscillating circuit 10 of the transponder to detect the presence of a radio-frequency signal and extract a clock from the carrier.

FIGS. 3A, 3B, 3C, and 3D illustrate the operation of the demodulator shown in FIG. 2. FIG. 3A shows an example of the shape of a signal Vlc across oscillating circuit 10 received from a terminal. FIG. 3B illustrates the shape of signal Vdc at the output of rectifying bridge 11 (upstream of filter 13). FIG. 3C illustrates the shape of signal Ve applied on the comparison inputs of comparators 13 and 14 and the comparison thresholds −ref and +ref set by resistors R1, R2, R3, and R4. FIG. 3D illustrates the result provided by the D output of flip-flop 15.

As illustrated in the left-hand portion of these drawings, rectified signal Vdc is, in principle, above or under its average value Vm according to state 1 or 0 of the transmitted bit. Capacitor C4 filters the D.C. component, so that signal Ve applied to the comparison inputs of comparators 13 and 14 only comprises, around value Vm, the edges on state switchings. The comparators detect when the signal comes out of the window defined by thresholds −ref and +ref, and flip-flop 15 provides a state 0 or 1 according to the direction of the detected threshold.

A problem is posed if the amplitude-modulation transmission flow rate is desired to be increased in the terminal-to-transponder direction. This problem is illustrated in the right-hand portion of the timing diagrams of FIGS. 3A to 3D. The state switchings of the envelope of the signal received around value Vm (FIG. 3B) are closer than in the left-hand portion of the timing diagrams.

As illustrated in FIG. 3C, signal Ve does not have time to come back to median value Vm before occurrence of the next edge of the modulated signal. Since only the edges are transmitted by capacitor C4 and the amplitude of these edges depends on the modulation index, the system becomes incapable of detecting subsequent switchings as long as the state has not been maintained for a sufficient time to enable signal Ve to recover quiescent value Vm.

This disadvantage results in that transponders are, in practice, limited to rates of from 100 to 400 kbits/s. Now, more and more applications require more significant flow rates (for example, electronic passports for the transmission of biometric data or multiple-application transponders).

Reducing the detection window set by thresholds −ref and +ref is no solution to this problem since the demodulator would become too sensitive to noise.

BRIEF SUMMARY OF THE INVENTION

The present invention aims at overcoming all or part of the disadvantages of known demodulators processing edges of a signal in amplitude modulation centered on a D.C. component.

The present invention more specifically aims at enabling acceleration of the flow rates of amplitude-modulated data in systems with a modulation index smaller than one.

The present invention also aims at providing a solution requiring no modification on the terminal side.

To achieve all or part of these objects, as well as others, the present invention provides an amplitude demodulator comprising at least:

a capacitive element for filtering a first D.C. component of an amplitude-modulated signal;

an element for detecting edges in the signal provided by the capacitive element; and at least one switching element for forcing, at least after detection of an edge, the returning of the signal provided by the capacitive element to a second D.C. component.

According to an embodiment of the present invention, a filtering element is present upstream of said capacitive element to provide an envelope of the amplitude-modulated signal.

According to an embodiment of the present invention, a resistive element provides said second D.C. component to the signal provided by the capacitive element.

According to an embodiment of the present invention, said switching element is formed of a switch short-circuiting said resistive element.

According to an embodiment of the present invention, said switching element is formed of a network of switched capacitances.

According to an embodiment of the present invention, said detection element comprises at least two elements for comparing the amplitude of the signal to be interpreted with respect to two values surrounding said second D.C. component.

According to an embodiment of the present invention, the switching element is controlled by a circuit detecting a state switching of the output of one of the comparators.

According to an embodiment of the present invention, the switching element is formed of at least one switch opening a branch of connection of the capacitive element to comparison inputs of said comparators.

According to an embodiment of the present invention, said second D.C. component corresponds to half the supply voltage of the demodulator.

The foregoing and other objects, features, and advantages of the present invention will be discussed in detail in the following non-limiting description of specific embodiments in connection with the accompanying drawings.

BRIEF DESCRIPTION OF THE SEVERAL VIEWS OF THE DRAWINGS

FIG. 4 partially shows in the form of blocks an embodiment of a terminal of an amplitude demodulator according to the present invention;

FIGS. 5A, 5B, and 5C illustrate in timing diagrams the operation of the demodulator of FIG. 4; and FIG. 6 partially illustrates a variation of the present invention.

DETAILED DESCRIPTION

Figure 1:
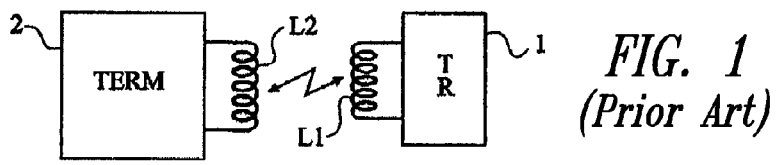
FIG. 1, previously described, very schematically shows in the form of blocks an example of an electromagnetic transponder system of the type to which the present invention preferentially applies.

In the following description, certain specific details are set forth in order to provide a thorough understanding of various embodiments. However, one skilled in the art will understand that the present systems and methods may be practiced without these details. In other instances, well-known structures, protocols, and other details have not been shown or described in detail to avoid unnecessarily obscuring descriptions of the embodiments.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the claimed invention.

Same elements have been designated with same reference numerals in the different drawings. For clarity, only those elements which are necessary to the understanding of the present invention have been shown and will be described hereafter. In particular, the respective structures of the digital systems (microprocessor or wired logic) of interpretation of the transmitted data have not been detailed, the present invention being compatible with conventional systems.

The present invention will be described hereafter in relation with one example of application to electromagnetic transponders. It should however be noted that it more generally applies to any system of transmission, especially radio-frequency, in amplitude modulation.

Figure 2:
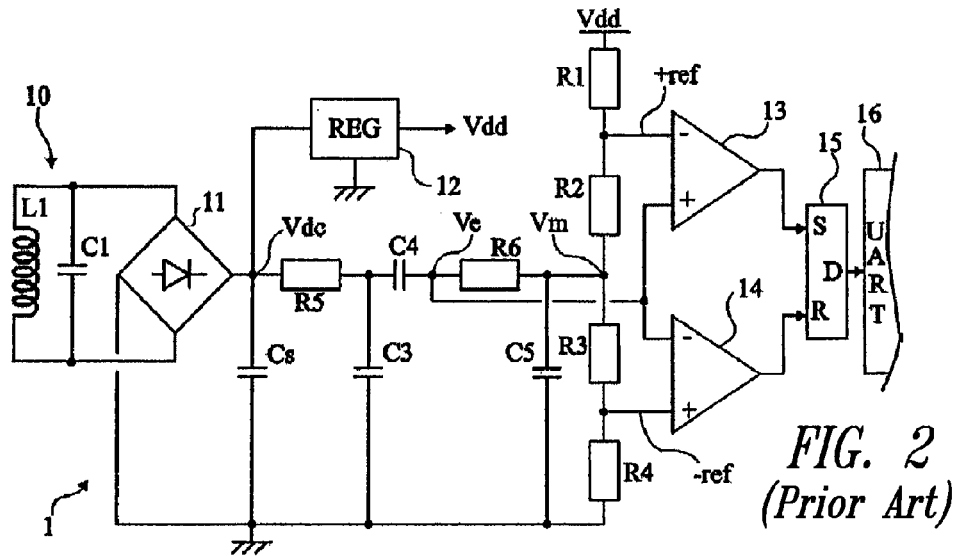
FIG. 2, previously described, partially shows, very schematically and in the form of blocks, an example of a conventional electromagnetic transponder architecture.

FIG. 4 schematically shows in the form of blocks an embodiment of an amplitude demodulator according to the present invention. For simplification, the transponder portion upstream of capacitor C4 providing edges of an amplitude-modulated signal rectified by a bridge (11, FIG. 2) has not been shown. Similarly, the other transponder components such as the voltage regulator, the clock generator, and the radio-frequency signal detector have not been shown.

As previously, voltage Ve comprising the state switching edges of the amplitude modulation is centered on a level Vm set by a dividing bridge (for example, a dividing bridge formed of resistors R1, R2, R3, and R4), a resistor R6 connecting the electrode of capacitor C4 to the junction point of resistors R2 and R3. As previously still, a capacitor C5 connects the terminal of resistor R6 opposite to capacitor C4 to ground and two comparators 13 and 14 receive on their respective comparison inputs (for example, non-inverting and inverting) signal Ve, and on respective reference inputs (for example, inverting and non-inverting) levels +ref and −ref defining the demodulator detection window. The outputs of comparators 13 and 14 are connected to the respective inputs S and R for setting to 1 and setting back to zero a flip-flop R15 having its output D providing the detected state to a digital interpretation circuit 16 (for example, a logic and arithmetical unit, UART). It is assumed that resistors R1 and R4 have the same value and that resistors R2 and R3 have the same value so that level Vm corresponds to Vdd/2 and is centered between reference levels −ref and +ref. However, this is not compulsory, for example, if these levels are desired to be adapted to a comparator sensitivity difference according to the switching threshold.

According to one embodiment of the present invention illustrated in FIG. 4, a switch K is connected in parallel on resistor R6 to short-circuit it under control of a circuit 20 (CTRL) and thus immediately bring the D.C. component of voltage Ve to median value Vm set by the dividing bridge. Circuit 20 controls the turning-on of switch K after an edge has been detected by one of comparators 13 and 14. For this purpose, circuit 20 has two detection inputs connected to the respective outputs of comparators 13 and 14 and provides a control signal to switch K. The turning-on of switch K by circuit 20 is caused by a pulse and has a duration selected according to the time required to bring signal Ve to level Vm of the D.C. component on the comparator side. In simplified fashion, the pulse duration is selected to be as short as possible to avoid delaying the possible turning back on of the demodulator whatever the transmission rate.

FIGS. 5A, 5B, and 5C illustrate, in timing diagrams, the operation of the demodulator of FIG. 4. FIG. 5A shows rectified envelope Vdc of the received signal (output of bridge 11, FIG. 2). FIG. 5B illustrates the corresponding voltage Ve and FIG. 5C illustrates data output D of flip-flop 15.

Figure 3A:
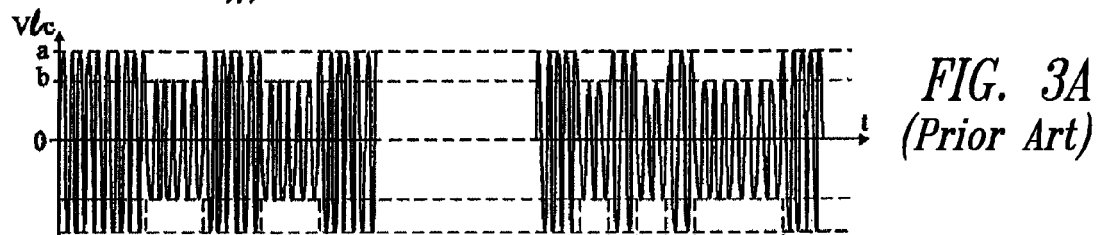
FIGS. 3A, 3B, 3C, and 3D, previously described, illustrate the operation of the demodulator of FIG. 2.
Figure 3B:
Figure 3C:
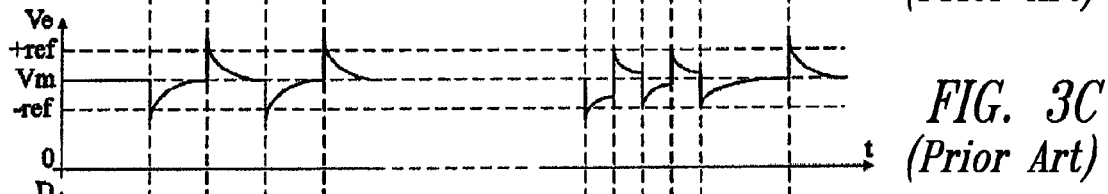
Figure 3D:
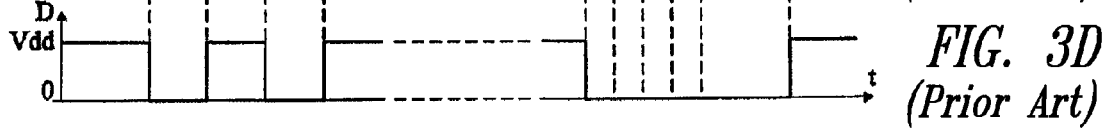

As illustrated in FIG. 5B, as soon as an edge is detected by one of comparators 13 and 14, the D output of the flip-flop switches state according to the direction of the detected edge. When the edge decreases with a shape (capacitive discharge) such as illustrated in previously-described FIG. 3C, and the corresponding comparator switches back (that is, threshold +ref or −ref is reached in the other direction), circuit 20 causes the turning-on of switch K, which immediately brings voltage Ve to level Vm. The demodulator is then reset and can properly operate for the interpretation of the next edge.

The right-hand portions of FIGS. 5A, 5B, and 5C show that with the identical control of switch K, the rate can be accelerated with respect to the conventional case.

According to an alternative embodiment, not shown, the duration of the turn-on pulses of switch K is adapted to the expected rate, for example, by means of a configuration signal CONFIG received by circuit 20 and originating from microprocessor 16. Such a variation enables, among others, optimizing the power consumption by adapting the operation of the switching circuit of the present invention according to what is necessary.

Another advantage of this variation is that by adapting the duration of the periods when the voltage of signal Ve is forced to the quiescent state, possible noises generating wrong detections are eliminated. In a way, an operation window of the edge detector is defined around times expected for the edges representing data.

According to another alternative embodiment, circuit 20 triggers the turning-on of switch K as soon as it detects a state switching of one of comparators 13 and 14. This further accelerates the demodulator reset. In this case, the propagation delays are used in circuit 20 to guarantee a proper detection of the states by flip-flop 15. Indeed, the turning-on of switch K must not occur too soon after occurrence of an edge on signal Ve, failing which flip-flop 15 could not properly detect the data. The circuit adaptation to respect such an operation is within the abilities of those skilled in the art.

According to another alternative embodiment of the present invention, resistor R6 is suppressed and switch K directly manages the addition of the D.C. component of signal Ve periodically. This switch may be replaced with a network of switched capacitances bringing level Vm on signal Ve in the form of a precharge. It may be any other circuit capable of bringing D.C. component Vm to the electrode of capacitor C4 connected to the measurement inputs of comparators 13 and 14.

FIG. 6 partially and schematically shows a variation of the present invention in which, instead of short-circuiting resistor R6, the connection of the electrode of capacitor C4 to the comparison inputs of comparators 13 and 14 is opened by means of a switch K'. This variation exploits stray capacitances C4', C13', and C14' respectively connecting capacitor C4 to ground and the measurement inputs of comparators 13 and 14 to ground. These stray capacitances indeed are those which condition the time of setting to average state Vm of level Ve. By turning off switch K' when a state is detected, the value of the stray capacitances connected to the node providing signal Ve is decreased and its discharge to level Vm is accelerated.

In an embodiment, a second switch K'' is interposed between the junction point of resistors R2 and R3 (and thus the point at level Vm) and the common reference inputs of comparators 13 and 14 to avoid letting these inputs float. The control of switch K'' is inverted with respect to that of switch K'.

An advantage of an embodiment of the present invention is that it enables increasing the transmission rate in the terminal-to-transponder direction.

Another advantage of an embodiment of the present invention is that it requires no modification of existing terminals.

Another advantage of an embodiment of the present invention is that it does not require increasing the sensitivity of the comparators, and thus their consumption.

Another advantage induced by an embodiment of the present invention is that it enables increasing the values of resistors R1, R2, R3, and R4 to decrease the consumption of the bridge setting the comparison references since this bridge no longer needs injecting current into resistor R6 to bring the level of signal Ve to level Vm.

Of course, the present invention is likely to have various alterations, modifications, and improvements which will readily occur to those skilled in the art. In particular, the practical implementation of control circuit 20 of switch K to respect the described functionalities is within the abilities of those skilled in the art. For example, the duration of the pulses for turning on switch K (or turning off switches K' and K") after each edge detection may be set by analog elements (RC cell) or from the clock recovered by the transponder on the carrier.

Further, although the present invention has been described in relation with a specific demodulator structure, it can be easily transposed and applies to any demodulator based on an element (C4) filtering a D.C. component on the antenna side to only keep the envelope edges and adding a D.C. component to these edges. For example, the two comparators, the flip-flop, and the dividing bridge setting the comparison references may be replaced with any edge detection circuit (including not detecting the direction of the edges and a state machine managing the edge consecutivity or using a clock and an initial reference to interpret the data from the successive state switchings).

Further, the transposition of the present invention to another application than electromagnetic transponders (remotely supplied or not) is also within the abilities of those skilled in the art.

Finally, although the present invention has been described by using a vocabulary corresponding more to a hardware forming, the implementation may partially use software means.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. An amplitude demodulator, comprising:
   a capacitive element to filter a first D.C. component of an amplitude-modulated signal with a modulation index smaller than one and to provide an output signal from the filtered signal, said modulation index being defined as a difference between an amplitude of a state 1 and an amplitude of a state 0 of transmitted bits divided by a sum of said amplitudes;
   an element to detect edges in the output signal provided by the capacitive element; and
   at least one switching element to force, at least after detection of an edge, a return of the output signal provided by the capacitive element to a second D.C. component.

2. The demodulator of claim 1, wherein a filtering element is present upstream of said capacitive element to provide an envelope of the amplitude-modulated signal.

3. The demodulator of claim 1, wherein a resistive element provides said second D.C. component to the output signal provided by the capacitive element.

4. The demodulator of claim 3, wherein said switching element is formed of a switch adapted to short circuit said resistive element.

5. The demodulator of claim 1, wherein said switching element is formed of a network of switched capacitances.

6. The demodulator of claim 1, wherein said element to detect edges includes at least two comparators to compare an amplitude of the output signal with respect to two values surrounding said second D.C. component.

7. The demodulator of claim 6, wherein the switching element is controlled by a circuit adapted to detect a state switching of an output of one of the at least two comparators.

8. The demodulator of claim 6, wherein the switching element is formed of at least one switch adapted to open a branch of connection of the capacitive element to comparison inputs of said comparators.

9. The demodulator of claim 1, wherein said second D.C. component corresponds to half a supply voltage of the demodulator.

10. An amplitude demodulator apparatus, comprising:
    a capacitive element to filter a first DC component of an amplitude-modulated signal having a modulation index smaller than one, said modulation index being defined as a difference between an amplitude of a state 1 and an amplitude of a state 0 of transmitted bits, divided by a sum of said amplitudes;
    a circuit coupled to the capacitive element to detect edges in an output signal provided by the capacitive element; and
    at least one switching element coupled to the capacitive element to force, at least after detection of an edge, a return of the output signal provided by the capacitive element to a second DC component.

11. The apparatus of claim 10, further comprising a filtering element coupled upstream of the capacitive element to provide an envelope of the amplitude-modulated signal.

12. The apparatus of claim 10, further comprising a resistive element coupled to the capacitive element to provide the second DC component to the output signal provided by the capacitive element.

13. The apparatus of claim 10 wherein the circuit comprises at least two elements to compare an amplitude of the output signal to values surrounding the second DC component.

14. The apparatus of claim 10, further comprising a control circuit coupled to the switching element to control operation thereof based on an output of one of the compare elements.

15. A transponder system, comprising:
    an oscillating circuit to provide an amplitude-modulated signal having a modulation index smaller than one, said modulation index being defined as a difference between an amplitude of a state 1 and an amplitude of a state 0 of transmitted bits, divided by a sum of said amplitudes; and
    an amplitude demodulator coupled to the oscillating circuit, the demodulator including:
       a capacitive element to filter a first DC component of the amplitude-modulated signal;
       a detection circuit coupled to the capacitive element to detect edges in an output signal provided by the capacitive element; and
       at least one switching element coupled to the capacitive element to force, at least after detection of an edge, a return of the output signal provided by the capacitive element to a second DC component.

16. The system of claim 15, further comprising:
    a filtering element coupled upstream of the capacitive element to provide an envelope of the amplitude-modulated signal;
    a resistive element coupled to the capacitive element to provide the second DC component to the output signal provided by the capacitive element; and a control circuit coupled to the switching element to control operation thereof based on an output of one of the detection circuit.

17. A method for a transponder, the method comprising:

filtering a first DC component of an amplitude-modulated signal with a capacitive element, said amplitude-modulated signal having a modulation index smaller than one, said modulation index being defined as a difference between an amplitude of a state 1 and an amplitude of a state 0 of transmitted bits, divided by a sum of said amplitudes;

detecting edges in an output signal provided by the capacitive element; and forcing, at least after detection of an edge, a return of the output signal provided by the capacitive element to a second DC component.

18. The method of claim 17 wherein detecting the edges includes comparing an amplitude of the output signal to values surrounding the second DC component.

19. The method of claim 18, further comprising controlling forcing of the return of the second DC component based on a result of the comparing.

20. The method of claim 17, further comprising filtering the output signal provided by the capacitive element to provide an envelope of the amplitude-modulated signal.

* * * * *